United States Patent Office 3,299,268
Patented Jan. 17, 1967

3,299,268
QUANTITATIVE CHEMICAL ANALYSIS COMPRISING IRRADIATING WITH NEUTRONS AND MEASURING THE CHARACTERISTIC DECAY PATTERN
Haruo Muto, Yokohama-shi, and Koichi Onodera, Kawasaki-shi, Japan, assignors to Tokyo Shibaura Electric Co., Ltd., Kawasaki-shi, Japan, a corporation of Japan
Filed June 12, 1963, Ser. No. 287,396
Claims priority, application Japan, June 14, 1962, 37/24,251
2 Claims. (Cl. 250—83.1)

This invention relates to a method of quantitative chemical analysis wherein a sample having a component therein whose quantity is to be determined is irradiated with a radioactive flux so as to form a radionuclide of said component. The disintegration of radionuclide produced in the sample component is then measured without the use of the referential standard sample.

With recent progress in technique, elementary analysis of raw materials becomes important in order to attain better process control in all fields of production. Heretofore, elementary analysis was usually made by chemical analysis, but as this method of analysis requires substantial time, it is inconvenient to apply it for process control. In order to meet the requirement for simple and rapid analysis, physical analysis has been investigated extensively, and radiometric analysis was proposed to be most suitable for such purpose. If radiometric analysis which can effect elementary analysis promptly and simply were developed, it would become possible to produce products of uniform quality when it is applied to process control of the product.

With radioactivation analysis, elements to be analysed contained in the sample (for brevity, hereinafter will be called "nuclides" or "radionuclides") are irradiated with radioactive flux, neutron flux for instance, to convert them into radioactive nuclides, and then the radioactivity of the radioactive nuclides is measured to quantitatively analyse said elements.

Generally the degree of disintegration of radioactive nuclides produced by irradiation with radioactive flux, neutron flux for instance, is represented by the following equation:

$$\frac{dN'}{dt} = Nf(t)\delta - \lambda N' \quad (1)$$

where $N$ is number of nuclide atoms,
$N'$ is number of radioactivated nuclide atoms,
$f(t)$ is density of neutron flux,
$\delta$ is activation cross section,
$\lambda$ is disintegration constant of radioactive nuclide,
$t$ is time.

Radioactive nuclides produced by neutron flux irradiation will disintegrate with time. More particularly each of the produced radioactive nuclides will disintegrate under particular disintegration constant while radiating $\beta$ particles, $\gamma$ rays and the like according to particular isotope characteristics specific to the nuclide. Thus, it is able to distinguish a particular nuclide from the others by measuring the quality of emitted radiation and the half-life period of disintegration. Accordingly, it is possible to quantitatively determine the number of atoms of the nuclides contained in the sample if one can measure the density of said neutron flux $f(t)$ simultaneously with the number of radioactivated nuclide atoms $N'$.

However, at present, in any neutron generating apparatus represented by a nuclear reactor, inasmuch as the density of neutron flux is not always constant but fluctuates with time it is not possible to base the analysis upon the measurement of the total number of radioactivated nuclide atoms, according to the Formula 1. Heretofore, the following method has been used to effect accurate radiometric analysis which is free from the effect caused by the difference in the measured amount of the disintegration of the radioactive nuclide produced due to such fluctuation of the density of neutron flux. Namely, a referential standard sample was separately prepared containing a predetermined amount of the nuclide which is the same as that to be determined quantitatively and which was used as a reference sample, the measured sample and the reference sample were irradiated simultaneously from the same source of neutron flux, and the radioactivities produced in both of the samples were compared to quantitatively determine the element to be measured in the measured sample.

With said method, it is true that a reliable measurement can be made which is free from the effect of fluctuation in the density of neutron flux. However at least two sets of radioactive measuring devices and sample handling devices such as pneumatic tubes were required, because the radioactivity produced in the sample to be measured and the standard sample had to be measured simultaneously. This has caused such inconvenience as requiring bulky equipment which is difficult to manipulate, and preparing many standard samples for each element to be measured.

An object of this invention is to accurately carry out radioactivation analysis by means of a simple apparatus and simple operation.

Another object of this invention is to carry out radioactivation analysis without the necessity of fluctuation in the density of the radioactive flux.

The above objects can be attained by detecting the radioactive flux irradiated to the sample, integrating, by means of an integrating circuit, the electrical output of an amplifier which is obtained in response to the density of said radioactive flux, making, in indicating such output, the time constant of said integrating circuit coincide with the reciprocal of the disintegration constant of said radioactive nuclide produced in the sample due to irradiation, and measuring the produced disintegration amount of said radioactive nuclide independently from the fluctuation of the density of the radioactive flux.

These features of the invention which are believed to be novel are specifically set forth in the claims attached hereto. The invention will, however, be better understood and further advantages thereof appreciated from a consideration of the following description and drawing, in which:

Figure 1:
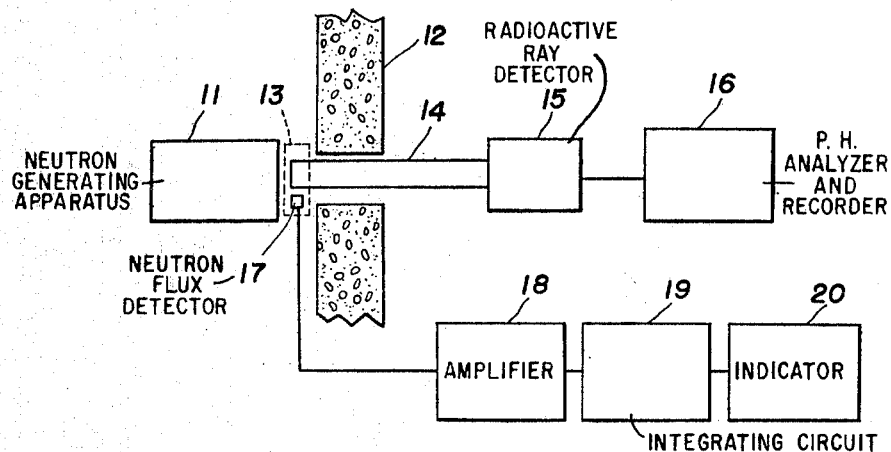
FIG. 1 is a block diagram of one embodiment of a radioactivation analysing apparatus used in this invention.

Referring now to FIG. 1 of the accompanying drawing, there is shown a neutron generating apparatus 11 in a chamber masked by a shield 12. The neutron generating apparatus 11 may be a conventional nuclear reactor or an apparatus which generates neutrons only. For instance, it is preferable to use a neutron generating apparatus wherein heavy hydrogen obtained by electrolysing heavy water is introduced into a source of ion through a palladium leak, an electric discharge is formed in the heavy hydrogen by means of a high frequency electric field to create a plasma, and the deutrons formed are introduced in an accelerating tube evacuated to a high vacuum to be accelerated by an electric field of 200 kv., for example, so as to impinge upon a heavy hydrogen, for example tritium, target disposed at the exit end of the accelerating tube to generate neutrons by the T$d$ reaction. The output of neutrons obtainable in this case may be of the order of about $10^{10}$ n./sec.

Extending through the shield 12 is an air transfer tube 14 with one end connected to a radioactive ray detector 15 which is electrically connected to a radiation measuring device 16. On the end of the air transfer tube that is facing the neutron generating apparatus there is provided a neutron irradiated member 13, and the samples contained in rabbit cases are transferred between the member 13 and the radioactive ray detector 15 through the air transfer tube 14. The radioactivity formed in the sample by neutron irradiation is detected by the radioactive ray detector 15 which may be a scintillator of the NaI(T1) type. It is advantageous to use a pulse height analyser which analyses the detector output of the detector 15, for example, and then records the result of analysis on a scaler.

A neutron flux detector 17 is also contained in the neutron irradiated member 13. This detector serves to detect the neutrons so as to derive an electric output, for example, a number of pulses proportional to the neutron flux density. A plastic scintillator of high sensitivity comprising a combination of a plastic fluorescent substance and a photomultiplier is suitable for this purpose. Signals from the neutron flux detector 17 are amplified by an amplifier 18. Since the signals obtained are in the form of pulses, a suitable counting rate meter (not shown) is included in the amplifier 18 which integrates said pulses to produce a D.C. voltage proportional to the frequency of the pulses. Thus, the output voltage from the amplifier 18 has a value which is proportional to the neutron flux density. The output voltage is then applied to an integrating circuit 19. Where an ionization chamber is utilized as the detector 17, the output voltage is a D.C. voltage so that in this case the counting rate meter may be omitted.

Figure 2:
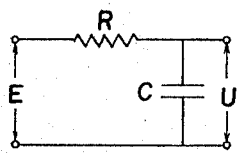
FIG. 2 is a diagram of an integrating circuit to explain this invention.

As shown in FIG. 2, the integrating circuit 19 may be comprised of a resistor R and a capacitor C and by denoting the input voltage by E, and the output voltage by V, the change of V with respect to time may be represented as follows:

$$\frac{dV}{dt} = \frac{E}{cr} - \frac{V}{cr} \quad (2)$$

where $r$ represents the resistance of the resistor R,
$c$ represents the capacitance of the capacitor C, and
$t$ represents the time.

Since the input voltage E is proportional to the neutron flux density $f(t)$ to be detected, $$E = kf(t) \quad (3)$$

where $k$ is a proportional constant.

By substituting the Equation 3, the Equation 2 can be changed to $$\frac{dV}{dt} = \frac{df(t)}{cr} - \frac{V}{cr} \quad (4)$$

When comparing Equation 4 with Equation 1, it will be clear that the output voltage V of the integrating circuit 19 corresponds to the number N' of radioactivated nuclide atoms. Now if the time constant $cr$ of the integrating circuit 19 were made to correspond to the reciprocal of the disintegrating constant $\lambda$ of the radioactive nuclide being measured, namely $$cr = \frac{1}{\lambda} \quad (5)$$

it would be possible to record on a strip-chart recorder contained in the indicator 20 a proportional amount of the disintegration of the radioactive nuclide produced as the result of neutron flux irradiation. Accordingly, by suitably presetting the scale of the indicator, the said amount can be read directly. Thus, in accordance with this invention, in radioactivation analysis it is possible to measure the amount of disintegration of the radioactive nuclides produced at the end of the neutron flux irradiation. Further, since the amount of produced distintegration is proportional to the radioactivity produced in the radioactive nuclide, by using said amount of produced disintegation as the basis of comparison in the radioactivation analysis a number of samples which have been irradiated under different distributions of the neutron flux density with regard to time can be compared to each other using the same scale.

As has been pointed out hereinabove, in the prior method of radioactivation analysis, a substance containing a predetermined amount of the nuclide which is the same as the nuclide to be quantitatively measured was used as the reference sample and the sample to be measured and the standard sample were placed side by side to be irradiated simultaneously by neutrons. Assuming now that the number of atoms of the nuclide to be quantitatively determined is denoted by N$s$, that of the standard sample by N$m$, and the produced radioactivity by A$s$ and A$m$, respectively, then the relation between $$As \Big/ \frac{Am}{Nm}$$

and N$s$ will be always linear irrespective of any fluctuation of the neutron flux. Thus, by predetermining said relation, it may be possible to determine the number of atoms N$s$ contained in the sample.

According to this invention a function equivalent to the standard sample is provided by an electric circuit. By selecting the numerical condition as shown by the Formula 5, the output voltage V of the integrating circuit 19 may become proportional to the number of atoms N' of the radioactive nuclide, so that the value of the N$s$ can be determined by measuring the value of $As/V$ instead of measuring the values of $$As \Big/ \frac{Am}{Nm}$$

because the relation between $As/V$ and N$s$ is linear as a matter of course. Thus, if the relation between A$s$ and N$s$ were predetermined by the above mentioned equations, by ceasing neutron irradiation at the time when V reaches a constant value then N$s$, that is the amount of nuclide (or element) to be quantitatively determined and contained in the sample, could be directly obtained from A$s$.

Figure 3:
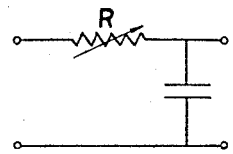
FIG. 3 shows a modification of the integration circuit.

As shown in the above Formula 5, since the time constant of the integration circuit is selected to correspond to the reciprocal of the disintegration constant of the radioactive nuclide, the time constant should be selected in accordance with the kinds of the nuclide to be quantitatively determined. However, it is very easy to vary the time constant of an integrating circuit. For example, as shown in FIG. 3 by varying the value of the resistor R, the time constant can be varied over a wide range. Although not shown in the drawing, the same result can be obtained by varying the capacitance of the capacitor C by means of a change-over switch, for example, to substitute different values of capacitance. Thus, by preselecting a number of time constants in accordance with the reciprocals of the disintegration constants of the kinds of the nuclides to be quantitatively determined it is possible to measure the amount of produced disintegration of any radioactive nuclide by mere selection of the time constant of the integrating circuit.

While the invention has been described with regard to a particular embodiment wherein samples are irradiated by neutrons, it will be clear that this invention can equally be applied to radioactivation analysis utilizing electrically charged particles, electromagnetic radiations and the like which can convert elements contained in the sample to be quantitatively determined into radioactive nuclides. It will, therefore, be understood that various changes may be made without departing from the spirit or scope of the

What is claimed is:

1. A system for the quantitative chemical analysis of substances, said system comprising means for generating neutron flux, means for presenting samples of the substance to be analyzed to the generated flux to be irradiated thereby and to form radioactive nuclides in an amount which is proportional to the amount of the substance present in the sample and to the amount of flux generated, each kind of said radioactive nuclides having a characteristic pattern of decay or half-life which is dependent upon the nature of the nuclide, means for measuring the amount of radioactivity induced in a sample of the substance being analyzed, said measuring means including a detector of radioactivity which generates electrical pulses proportional to the amount of radiation from said sample and a means for measuring and indicating by the amplitude of a first direct current the height of the pulses produced by said detector, a comparison device for determining and indicating the amount of neutron flux generated for irradiating said samples, said comparison device including means for detecting the neutron flux being generated and for producing a second direct electrical current in proportion thereto, and electrical circuit means connected to the output from said neutron flux detecting means for integrating said second direct current therefrom in accordance with the disintegration constant of the particular nuclide being measured at any time, the output from said electrical circuit means being directly proportional to the radiation produced by a known amount of a selected nuclide irradiated by the available flux, whereby the outputs from said integrating circuit and from said measuring means may be compared to determine the amount of the element being measured that is contained in said samples, said electrical circuit comprising at least a resistor and a capacitor connected together, the values of said resistor and said capacitor being such that the time constant of said electrical circuit is proportional to the reciprocal of the disintegration constant of the nuclide being measured.

2. The system defined in claim 1 wherein the time constant of said electrical circuit is selected by adjusting the value of said resistor.

References Cited by the Examiner
UNITED STATES PATENTS

| | | | |
|---|---|---|---|
| 2,990,353 | 6/1961 | Howard et al. | 250—83.1 X |
| 3,069,545 | 12/1962 | Lide et al. | 250—83.1 |
| 3,084,254 | 4/1963 | Goupil et al. | 250—83.6 |
| 3,124,679 | 3/1964 | Tittman et al. | 250—43.5 |

RALPH G. NILSON, *Primary Examiner.*

ARCHIE R. BORCHELT, *Examiner.*